Nov. 13, 1951 G. A. TINNERMAN ET AL 2,575,320
TOOL FOR APPLYING THREADLESS FASTENERS
Filed June 10, 1948 2 SHEETS—SHEET 2
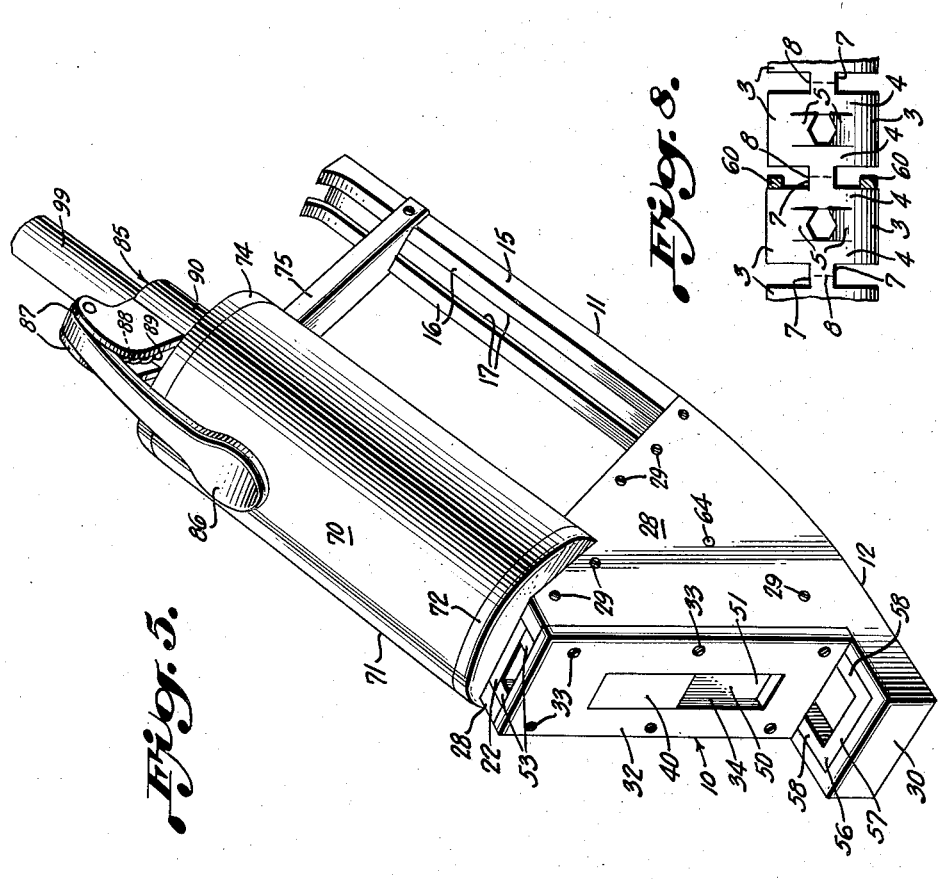
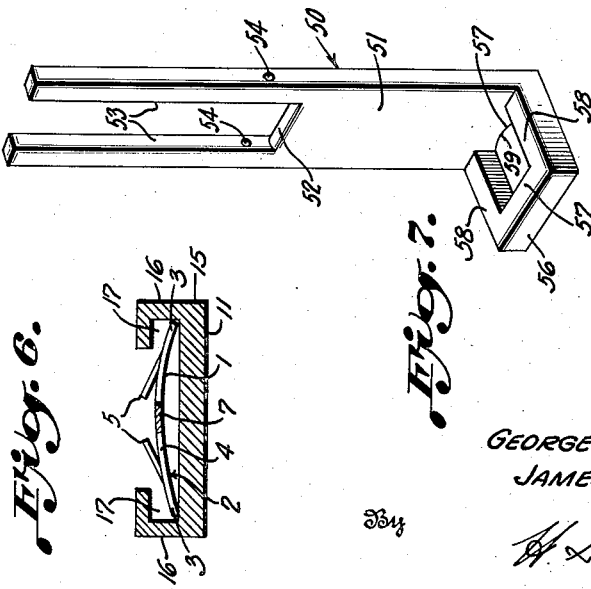
Inventors
GEORGE A. TINNERMAN
JAMES F. RAFFERTY
By
H. G. Lombard
ATTORNEY Patented Nov. 13, 1951

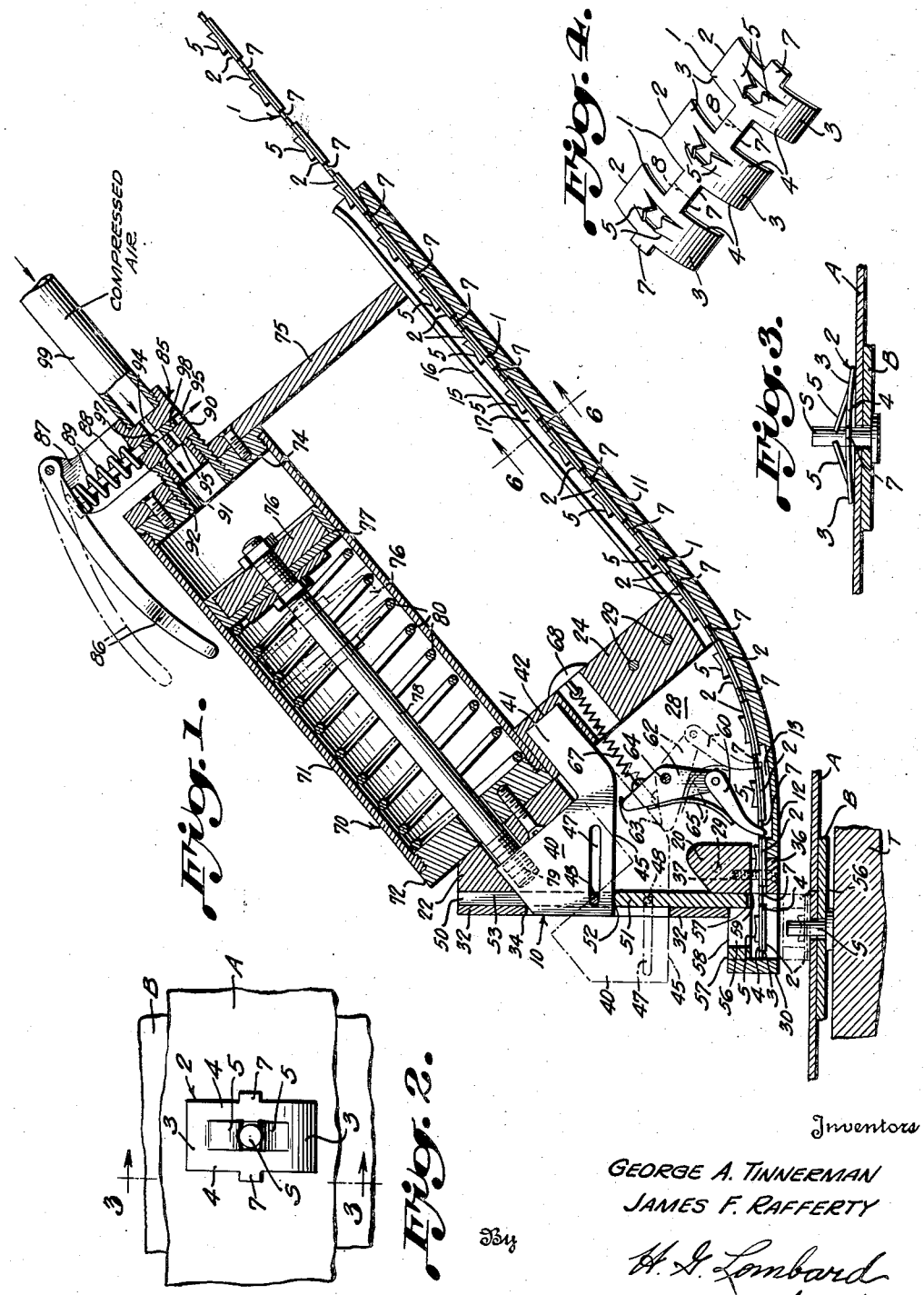

2,575,320

UNITED STATES PATENT OFFICE 2,575,320

TOOL FOR APPLYING THREADLESS FASTENERS

George A. Tinnerman and James F. Rafferty, Cleveland, Ohio, assignors to Tinnerman Products, Inc., Cleveland, Ohio, a corporation of Ohio Application June 10, 1948, Serial No. 32,146

10 Claims. (Cl. 81—3)

This invention relates to improvements in tools for applying sheet metal or spring nut fastening devices to locked fastening engagement on a fastening stud of any nature such as the shank of a rivet, an integral connecting shank on a part to be secured, or a conventional bolt or screw.

The tool of the invention is employed to apply fasteners in the form of sheet metal or spring nut devices which are constructed of relatively thin sections of sheet metal such as heat treated, tempered spring steel from which stud engaging means are struck and formed to project upwardly out of the plane thereof when engaged with a stud or other shank under tension. The tool is readily adaptable to use for applying such fasteners in any form, particularly the kind having an upwardly arched or bowed base that is tensioned in fastening position to cause the stud engaging means to exert an axial drawing action on the stud which provides a tightened fastening assembly of the parts secured under constant spring tension. Due to the inherent resiliency of the metal and the manner in which the stud engaging means are provided, such spring fasteners are capable of quick, easy application to fastening engagement onto a bolt or stud by a substantially direct axial thrust-like force which effects a sliding engagement of the said stud engaging means with the stud to the applied fastening position of the fastener in which the stud engaging means are disposed in locked embedded engagement with the stud, and the tensioned base of the fastener exerts a continuously effective axial drawing action on the stud to ensure a locked tightened installation of the parts secured, as aforesaid.

Inasmuch as these spring nuts and similar fasteners are often small and difficult to manipulate in applying the same to fastening position on the studs, the handling of the fasteners is greatly facilitated when they are prepared in strip form and secured by the tool of the present invention which is designed for automatically applying the individual fasteners in any number and otherwise automatically feeding the fasteners successively into position for application by the tool in a minimum of time and effort on the part of the operator, thereby greatly reducing the cost and time involved in many types of assemblies produced by mass production methods.

A primary object of the invention is to provide an improved tool for applying such fasteners as prepared in strip form in an arrangement whereby the tool automatically performs in a single actuation, the several operations of automatically severing a fastener from the strip, automatically applying the severed fastener to locked fastening position on the stud or shank, and automatically feeding the strip forward to present the next succeeding fastener to be severed and applied in a repetition of the foregoing cycle of operation.

Another object of the invention is to provide a tool of the kind described which comprises a reciprocating cross head which in a single actuation provides the force for effecting all the foregoing described operations of severing a fastener from the strip, applying the fastener, and feeding the strip to locate the next succeeding fastener in position to be severed from the strip and applied to a stud or other shank.

An additional object of the invention is to produce a tool, as aforesaid, wherein compressed air or other fluid pressure means is employed to actuate the tool and is so incorporated in the tool as to provide a light weight, compact device that is fool-proof and easily and quickly handled and operated with much greater speed and economy than any heretofore known tool or device.

Another object of the invention is to provide a tool of this character which is especially designed to receive fasteners of the kind described as prepared in strip form and in a manner in which the fasteners are not subjected to undue bending forces and strains in the handling, application and feeding thereof. The arrangement is such that when the fasteners used are of the type which have the advantageous generally arched or bowed base construction, such fasteners are prepared in strip form with the arched bases extending transversely of the strip and joined at their sides by connecting web portions which are severed to cut each fastener from the strip without in any way distorting or deforming the fasteners from their original arched configuration as designed for most effective application to the stud or other shank, as aforesaid.

A further object of the invention, therefore, is to provide an improved fastening strip construction for use in a tool such as described which comprises a series of spring nuts, or the like, having generally arched bases extending transversely of the strip and connected together by web portions between the sides of adjacent fasteners of the strip.

Further objects and advantages of the invention and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Fig. 1 is a vertical sectional view through the body of the tool in accordance with the invention showing the same in position for applying a fastener to a stud in an assembly of parts to be secured;

Fig. 2 is a top plan view of the assembly of the parts secured showing the spring nut fastener in applied fastening position on the stud or other shank;

Fig. 3 is a sectional view of Fig. 2 along line 3—3 showing the applied fastener in edge elevation;

Fig. 4 is a perspective view illustrating the fasteners used with the tool of the invention as prepared in strip form;

Fig. 5 is a perspective view showing the outward design and appearance of the complete tool;

Fig. 6 is a sectional view of Fig. 1 along line 6—6, looking in the direction of the arrows, showing the formation of the guideway of the tool for accommodating the fasteners in strip form;

Fig. 7 is a perspective view of the ram or plunger member of the tool for severing the fasteners from the strip and applying the individual fasteners to fastening engagement with a stud or other shank; and Fig. 8 is a top plan view of a fragment of the fastener strip illustrating the disposition of the strip in the tool and the arrangement for advancing the strip by the feeding mechanism of the tool.

The sheet metal or spring nut devices which are applied by the tool of the present invention are constructed from relatively thin sections of any suitable sheet metal, preferably spring metal or cold rolled metal having spring characteristics. As shown in Figs. 2 and 3, any such sheet metal or spring nut fastener is employed to secure a fastening assembly of any two or more parts A, B, by means of a stud or shank S. The stud S is provided in any desired manner as by an integral stud on one of said parts extending through an opening in the other, or by the shank of a rivet, bolt or screw passing through aligned openings in said parts and having the head thereof suitably bolstered for the fastening operation as by a work table T, Fig. 1. By way of example, one type of such a fastener as prepared in the form of a strip I is shown in Figs. 4 and 8, with each fastener comprising a generally rectangular section 2 defined by end portions 3 and bridge or side portions 4 between which integral yieldable stud engaging means such as tongues 5, for example, are formed to extend upwardly for engaging a stud or other shank under tension. The said end and bridge portions provide what may be termed, the body of the fastener, which body is so formed in the stamping operation as to present a normally untensioned, generally arched or concave base. When such a fastener is applied to the shank of the stud or bolt, the yieldable stud engaging elements 5 readily slide along the shank to the point at which the fastener base contacts the adjacent work surface or part secured; at such point, the end portions 3 are moved from their initial, normally untensioned position in the generally concave base outwardly and upwardly in a substantial lifting force which is transmitted to the tongues 5 to urge the extremities thereof inwardly toward each other such that said tongues are caused to dig into and become embedded in the shank and resist any tendency toward reverse movement or loosening. At the same time, the bowed side portions 4 are elongated such that the generally concave base assumes the position of a substantially flat or only slightly arched plate in anchored relation with the stud or shank. The bending moment which serves to anchor the nut device onto the stud or bolt is produced by the tensioned side and end portions which are flattened against the adjacent surface of the work, and which, in attempting to resume their initial, normally untensioned configuration in the generally concave base, assume only a slightly bowed or arched formation and thereby urge the tongues or stud engaging elements 5 inwardly toward each other to locking engagement with the stud and simultaneously exert an axial drawing action on the stud to provide a tightened fastening assembly of the parts secured under constant spring tension.

As shown in Figs. 4 and 8, the spring nuts 2 are prepared in the form of a strip I with their generally arched or bowed bases extending transversely of the strip and with the sides of the adjacent fasteners joined by connecting webs 7 which are severed along the dotted lines 8 by the instant tool to separate the individual fasteners from the strip just prior to the application of a severed fastener to secure an assembly of parts, as aforesaid. The provision of the fasteners 2 with their arched bases extending transversely of the strip is most important from the standpoint of manufacture of the strip inasmuch as the fasteners may thus be stamped and formed in an arched or bowed base formation with the ends of each fastener extending free in the normal untensioned configuration of the fastener and without distortion or deformation of any nature for application to fastening position on a stud or shank in the most effective manner, as presently to be described.

A divisional application Serial Number 249,366 filed October 2, 1951, is directed to the invention involved in the construction of the fasteners in the form of a continuous strip for use with the tool disclosed herein or any other suitable tool adapted to separate the fasteners individually from the strip and apply to fasteners to fastening position in an assembly of parts to be secured.

The tool designated generally 10 comprises an elongate base 11 having a generally flat plate portion 12 at its forward end which is adapted to be applied in generally horizontal relation to an assembly of parts to be secured. A recess or countersunk opening 13 is provided in the upper surface of said forward plate portion 12 and from this region the base preferably is curved gradually upwardly to define a downwardly inclined chute or guide portion 15 which facilitates the movement of the fastener strip I as it is advanced forwardly in the tool. The chute or guide portion 15 comprises undercut side flanges 16 providing guideways 17, Fig. 6, receiving the longitudinal edges of the fastener strip defined by the ends 3 of the aligned fasteners 2.

Within the tool, a base block 20 is positioned in spaced relation above the base plate portion 12 as necessary to permit passage of the fastener strip I. A head block 22 in the upper portion of the tool together with a rear block 24 provide solid supports for side plates 28 which are secured to said blocks as by screws 29. The side plates 28 define an open box-like flange 30 at the forward end of the tool and serve to mount a front plate 32 which is fastened thereto by screws 33, Fig. 5, and is provided with an elongate slot 34 for accommodating the reciprocating cross head 40 of the tool. The base block 20 as thus secured in the tool between the side plates 28 provides a support for a transverse cutter bar 36 associated with the base plate 12 and which is secured by screws 37 in suitable spaced relation to said block 20 as necessary to permit passage of the fastener strip 1 therebetween.

The reciprocating cross head 40 comprises a rearward guiding and supporting projection 41 which is received in an opening 42 in the rearward block 24 to support said cross head in inoperative position. The lower edge of said cross head 40 defines a cam surface 45 which coacts with the ram or plunger 50 to reciprocate said ram when said cross head is actuated. The reciprocating head 40 is provided with a guide slot 47 for a transverse pin 48 which is secured at its ends to the reciprocable ram 50.

The ram 50, Figs. 1 and 7, comprises a vertical slide rod portion 51 having a cam edge 52 between a pair of spaced arms 53 provided with openings 54 for the ends of the transverse pin 48 carried by the cross head 40. The arrangement is such that the slide rod portion 51 of the ram is received in a vertical guide channel defined by the ends of the side plates 28 and is retained by the front plate 32 in said guide channel in slidable abutting relation to the base block 20 and head block 22. In this relation, the transverse pin 48 which extends through the guide slot 47 in the cross head is secured at its ends in the openings 54 in the spaced arms 53 of the ram to connect said cross head and ram together but in slidable relation to each other. The cam surface 45 on the cross head 40 is in engagement with the cam edge 52 on the ram and accordingly, on forward movement of the cross head to the position illustrated in broken lines in Fig. 1, said cam surface 45 drives the ram downwardly for a fastener applying operation. During this movement of the cross head 40, the transverse pin 48 slides in the slot 47, and on return of the cross head to its initial position, said pin 48 serves to lift the ram 50 and return the same to its normal position in the tool for the next fastener applying operation.

The ram 50 otherwise is provided with a clamping or presser foot portion 56 on its lower end having an open generally rectangular recess or slot extending transversely of the tool. The presser foot or clamping portion 56 is provided in accordance with the size of the fasteners 2 to define side clamping portions 57 and end clamping portions 58 for fitting onto and engaging the side portions 4 and end portions 3, respectively, of a fastener. The most effective locking action of the nut devices in a tight, rigid installation is obtained when the generally arched or concave bases thereof are flattened without any substantial pressure being exerted on the stud engaging elements or tongues 5. Any substantial pressure on the stud engaging elements 5 prevents the same from having smooth, sliding engagement with the shank of the bolt or stud on being applied, and also deforms the same with respect to the generally concave base such that the extremities of the tongues are not in most effective contact with the shank, whereupon the tongues have a tendency to slip in a tightened assembly thereby resulting in a loose faulty installation.

In the use of the tool of the instant invention a tight installation is ensured and any such tendency of the tongues or stud engaging elements to slip or loosen from applied fastening position is eliminated inasmuch as the clamping foot 56 is designed for advancing a fastener to locked fastening engagement on a stud by pressure applied directly to the side portions 4 and end portions 3 to flatten the generally concave base without engaging the stud engaging means 5, and thus, when the tool is withdrawn and the attendant pressure removed from the flattened side portions 4, the tension stored therein causes the tongues 5 to become embedded in the stud in the most effective manner. As illustrated in Fig. 7, the side clamping portions 57 of the clamping foot preferably are slightly arched so as to engage the arched side portions 4 of a fastener in a manner which ensures a slight arch in the fastener base in fully applied fastening position. The rearward edge 59 or heel of said ram otherwise serves as a sharp cutter edge which cooperates with the transverse cutter bar 36 to sever a fastener from the strip when the ram is actuated.

The open rectangular slot formation of the presser foot 56 is of considerable importance in the use of the tool inasmuch as such an open slot provides a sight opening which enables the operator to locate easily and quickly the proper position for the fastener to be applied to the stud. In other words, by such sight opening, the tool is readily positioned to locate the fastener to be applied with the stud engaging elements of the fastener equally centered on opposite sides of the stud for proper engagement therewith. Otherwise when the ram is actuated, said stud engaging tongues of the fastener and/or the stud are mutilated or deformed under force of the ram such that a faulty application of the fastener results.

The feeding mechanism for automatically advancing the fastener strip 1 within the tool comprises a pair of cooperating dogs 60 pivotally attached on opposite sides of a lever or link 62 the upper end of which defines a cam follower surface 63. The lever 62 in turn is pivotally mounted by a cross pin 64 having its ends secured in the side plates 28. The extremities of said dogs 60 extend into the countersunk recess 13 in the tool base 12 in a manner whereby said extremities of the dogs positively engage the sides of the fasteners 2 as seen in Fig. 8 to advance the strip in step by step relation in the tool. A leaf spring 65 attached to the lever 62 bears yieldably upon said dogs 60 to urge the same downwardly into engagement with the fastener strip but capable of yielding as necessary to ride over a fastener and engage the next succeeding fastener to move the strip forwardly the width of one fastener for each operation of the tool. A coil spring 67 is attached at one end to the link 62 and at its other end to the rear block 24, as by a lug device 68 holding the coil spring in a passage in said block 24. Said coil spring thus serves to pull the lever 62 and thereby urge the dogs 60 forwardly for a feeding operation. In the normal position of the feed mechanism thus provided, the cam follower end 63 on the pivoted lever 62 extends into the path of the cam surface 45 on the cross head 40. And accordingly, on forward movement of the cross head 40, the lever 62 and dogs 60 carried thereby are caused to move to the position of the broken line showing in Fig. 1. The arrangement is such that the extremities of the dogs 60 slide rearwardly over the immediately adjacent fastener and drop downwardly into the recess 13 into positive engagement with the side of said fastener. On the return movement of the cross head 40, the link 62 is free to return to its initial position under force of the distended coil spring 67 which automatically causes the dogs 60 to urge the strip 1 forward a distance approximating the width of the fastener previously engaged thereby.

The means for reciprocating the cross head 40 comprises a fluid pressure device 70 operated by compressed air or other fluid pressure means. Various other means may be employed for actuating the cross head 40 but the fluid pressure device shown provides a compact efficient mechanism contained within a cylinder 71 which is so mounted as to serve also as a handle for the tool. The cap 72 at the forward end of the cylinder is suitably bolted or otherwise rigidly secured to the head block 22 while the similar cap 74 at the rearward end is secured to a post 75 which is attached to the guide or chute 15 to support said chute and the cylinder 71 with respect to each other in the completed tool.

The cylinder 71 contains a piston 76 and associated washer 77 secured to one end of a piston rod 78. The other end of said rod 78 extends through passages in the forward cap 72 and head block 22 and is provided with a threaded extremity 79 screwed into a bore in the cross head 40 in fixed relation therewith. A coil spring 80 within the cylinder 71 is telescoped over the piston rod between the forward cap 72 and the piston 76 and thereby maintains said piston and the piston rod in normally retracted position and likewise, the cross head 40 connected to said piston rod 78, as aforesaid.

A suitable valve means 85 is provided to actuate the piston 76 and in the present example, the valve is shown provided preferably as one having a lever type handle 86 which is easily depressed by the palm of the operator while the handle defined by the cylinder 71 is held by the operator's fingers, so that the complete tool is both manipulated about the work and operated by one hand, leaving the other hand free for adjusting the work, etc. The valve handle 86 is pivotally mounted between spaced ears 87 in position to depress a valve stem 88 which is held normally in upwardly retracted inoperative position by a coil spring 89. The valve body 90 is provided with a fitting 91 which is connected to the cylinder 71 in any suitable manner as by a threaded bushing 92. The valve body comprises an air inlet port 94 and a bayonet type air outlet port 95 for the compressed air actuating the piston 76 under control of the valve stem 88 which is provided with a passage 97 and an adjacent plug portion 98 for this purpose.

With the valve handle 86 and valve stem 88 held in normal upwardly retracted position by the coil spring 89 as illustrated by the broken line showing of said handle in Fig. 1, the plug portion 98 of the valve stem obstructs the inlet port 94 to cut off the supply of compressed air or other fluid to the cylinder 71 so that the piston 76 is inoperative. To actuate the piston for operating the tool, the valve handle 86 is depressed to the position of the full line showing in Fig. 1 whereby the valve stem 88 is moved downwardly to dispose the passage 97 therein in line with the inlet port 94 while the plug portion 98 of said valve stem closes the outlet port 95 so that the piston 76 receives the full force of the compressed air admitted to the air cylinder 71 from the supply pipe 99. The piston 76 is thus actuated and in moving forwardly compresses the coil spring 80 and actuates the cross head 40 to operate the tool. When the valve handle 86 is released permitting the valve stem 88 to return to its initial position, the plug portion 98 of said valve stem closes the inlet port 94, to shut off the air supply and uncover the outlet port 95. This permits the air within the cylinder 71 to escape through the outlet port 95 under the expansive force of the compressed coil spring 80 which thereupon urges the piston 76 to its initial, normal position in the air cylinder in readiness for the next operation of the tool.

From the foregoing, it will be understood that in the operation and use of the tool for applying fasteners in accordance with the invention, the tool is loaded with a strip of the fasteners 2 substantially as shown in Fig. 1. The fasteners may be provided in any selected length of strip 1 or in a considerable quantity provided by a similar strip in a roll mounted on a reel, for example. In any event, when the leading end of a strip 1 is loaded into the tool, the fasteners 2 slide within the chute 15 as shown in Fig. 1 to a position in which the foremost fastener 2 is disposed under the clamping or presser foot 56 within the open box like flange 30. In this position, the side portions 4 of the foremost fastener underlie the side clamping portions 57 of the presser foot while the end portions 3 underlie the end portions 58 of said presser foot and the cutter edge 59 is adapted to cut the connecting web 7 along the dotted line 8, Fig. 4, to sever said foremost fastener from the next adjacent fastener of the strip. It will be understood that the connecting web 7 holds the foremost fastener 2 in the tool as described in preparation for the severing and applying of the fastener. Also, the cooperating dogs 60 slip over the foremost fastener 2 when the strip is initially inserted in the tool and engage the side of the next adjacent fastener as shown in Fig. 1 to hold the strip in the tool and in readiness for a feeding of the strip to advance said next adjacent fastener after the foremost fastener has been severed from the strip and applied.

With the tool thus loaded with a strip of fasteners, the tool is positioned over the stud S in an assembly of parts to be secured and so located that the stud engaging means or tongues 5 of the fastener to be applied are suitably centered with respect to the stud S of the assembly. The open rectangular slot formation of the presser foot 56 facilitates such positioning of the tool inasmuch as the open slot provides a sight opening which enables the operator to locate easily and quickly the approximate proper location of the stud engaging means 5 with respect to the stud S so that the fastener may be applied to the stud in the proper intended manner without mutilating the stud or deforming the stud engaging means 5 out of proper position for most effective fastening engagement with the stud, as previously explained.

The tool is then actuated by the operator upon pressure on the handle lever 86 which admits compressed air or other fluid pressure into the cylinder 71 to drive the piston 76 forwardly and compress the coil spring 80. The piston 76 thus moves the piston rod 78 which drives the cross head 40 downwardly to the broken line position shown in Fig. 1 both to actuate the ram 50 and set the feeding mechanism in operation for a feeding movement of the strip after actuation of said ram.

Both of these results are effected during a single forward movement of the cross head 40 by means of the cam surface 45 thereon. Thus, said cam surface 45 engages the cam edge 52 on the ram to drive the ram downwardly in a direct axial thrust by which the cutter edge 59 on the clamping foot 56 first severs the foremost fastener 2 from the strip and then simultaneously pushes the severed fastener directly onto the stud S to secure the parts of the assembly, as aforesaid.

During this same forward movement of the cross head 40, the said cam surface 45 thereon engages the cam follower surface 63 on the pivoted lever 62 to pivot the same to the broken line position shown in Fig. 1 in which the dogs 60 carried by said lever ride rearwardly over the next succeeding fastener 2 to the position in which the extremities of said dogs 60 drop downwardly into positive abutting engagement with the side edge of said fastener, as illustrated in Fig. 8.

When the foremost fastener has been applied, the handle lever 86 is released to permit the escape of the air within the cylinder 71 through the outlet port 95 in the valve 85 whereupon the compressed coil spring 80 within said cylinder is free to expand and return the piston 76 to its initial inoperative position. The cross head 40 is thereby returned to its initial position through the piston rod 78 whereupon the pin 48, slidably connecting the ram 50 to said cross head, serves to raise the ram 50 and return the same to its initial position. Simultaneously, on return movement of said cross head 40, the cam surface 45 thereon is disengaged from the cam follower surface 63 on the pivoted lever 62, whereupon said lever 62 is returned to its initial position under force of the distended coil spring 67. Such return motion of the pivoted lever 62 causes the dogs 60 carried thereby to move forwardly and thereby advance the strip 1 as necessary to locate the next fastener 2 under the clamping foot 56 in readiness for the next operation of the tool. The tool is then ready to be positioned to apply a fastener to the stud of another assembly and actuated by depressing the valve handle 86 to operate the tool in a repetition of the foregoing described procedure.

While the invention has been described in detail with a specific example, such example is intended as an illustration only, inasmuch as it will be apparent that modifications in the construction, arrangement and general combination of parts may be devised without departing from the spirit and scope of the invention.

What is claimed is:

1. A tool for applying fasteners comprising a base including a chute for a strip of fasteners, a cutter bar on said base, a cross head mounted for reciprocation in said tool, a reciprocable ram adjacent an end of said chute movable transversely to the movement of said cross head and having a cutter edge on its lower end movable past said cutter bar, and interconnecting means between said cross head and ram for causing said movement of said ram, movably mounted feeding means adjacent said chute and engageable by said cross head to move said feeding means in one direction, and means urging said movably mounted feeding means in the reverse direction, said cross head on operative movement causing said ram to sever a fastener from the strip and to apply the severed fastener, said cross head on operative movement engaging said movably mounted feeding means to set the same for feeding the strip and, on return movement of said cross head, disengaging from said feeding means to permit said feeding means to operate automatically to feed the strip and advance another fastener into position to be operated upon by said ram in a subsequent fastener applying operation.

2. A tool for applying fasteners comprising a base including a chute for a strip of fasteners, a cutter bar on said base, a cross head mounted for reciprocation in said tool, a reciprocable ram adjacent an end of said chute movably transversely to the movement of said cross head and having a cutter edge on its lower end movable past said cutter bar, and interconnecting means between said cross head and ram for causing said movement of said ram, feeding means adjacent said chute and comprising a movably mounted member in the path of movement of said cross head and including a feeding dog carried by said member, said member and dog being movable by said cross head in one direction, and means urging said member and dog in the reverse direction, said cross head on operative movement causing said ram to sever a fastener from the strip and to apply the severed fastener, said cross head on operative movement engaging said movably mounted member to set said dog for feeding the strip and, on return movement of said cross head, disengaging from said member to permit said dog to operate automatically to feed the strip and advance another fastener into position to be operated upon by said ram in a subsequent fastener applying operation.

3. A tool for applying fasteners comprising a base including a chute for a strip of fasteners, a cutter bar on said base, a cross head mounted for reciprocation in said tool, a reciprocable ram adjacent an end of said chute movable transversely to the movement of said cross head and having a cutter edge on its lower end movable past said cutter bar, and interconnecting means between said cross head and ram for causing said movement of said ram, feeding means adjacent said chute and comprising a pivotally mounted lever in the path of movement of said cross head and a feeding dog carried by said lever, said lever and dog being movable by said cross head in one direction, and means urging said lever and dog in the reverse direction, said cross head on operative movement causing said ram to sever a fastener from the strip and to apply the severed fastener, said cross head on operative movement engaging said lever to set said dog for feeding the strip and, on return movement of said cross head, disengaging from said lever to permit said dog to operate automatically to feed the strip and advance another fastener into position to be operated upon by said ram in a subsequent fastener applying operation.

4. A tool for applying fasteners comprising a base including a chute for a strip of fasteners, a cutter bar on said base, a cross head mounted for reciprocation in said tool, a reciprocable ram adjacent an end of said chute movable transversely to the movement of said cross head and having a cutter edge on its lower end movable past said cutter bar, a presser foot included in said ram located adjacent the lower end of said ram, and interconnecting means between said cross head and ram for causing said movement of said ram, movably mounted feeding means adjacent said chute and engageable by said cross head to move said feeding means in one direction, and means urging said movably mounted feeding means in the reverse direction, said cross head on operative movement causing said ram to sever a fastener from the strip and said presser foot to apply the severed fastener, said cross head on operative movement engaging said movably mounted feeding means to set the same for feeding the strip and, on return movement of said cross head, disengaging from said feeding means to permit said feeding means to operate automatically to feed the strip and advance another fastener into position to be operated upon by said ram and presser foot in a subsequent fastener applying operation.

5. A tool for applying fasteners comprising a base including a chute for a strip of fasteners, a cutter bar on said base, a cross head mounted for reciprocation in said tool, fluid pressure means for reciprocating said cross head comprising a cylinder serving also as a handle for said tool, a reciprocable ram adjacent an end of said chute movable transversely to the movement of said cross head and having a cutter edge at its lower end movable past said cutter bar, a presser foot included in said ram located adjacent the lower end of said ram, and interconnecting means between said cross head and ram for causing said movement of said ram, feeding means adjacent said chute and comprising a pivotally mounted lever in the path of movement of said cross head and a pair of feeding dogs carried by said lever, said lever and dogs being movable by said cross head in one direction, and a spring urging said lever and dogs in the reverse direction, said cross head on operative movement causing said ram to sever a fastener from the strip and said presser foot to apply the severed fastener, said cross head on operative movement engaging said lever to set said dogs for feeding the strip and, on return movement of said cross head, disengaging from said lever to permit said dogs to operate automatically to feed the strip and advance another fastener into position to be operated upon by said ram and presser foot in a subsequent fastener applying operation.

6. A tool for applying fasteners comprising a base including a chute for a strip of fasteners, a cutter bar on said base, a cross head mounted for reciprocation in said tool, a cam on said cross head, a reciprocable ram adjacent an end of said chute and in the path of movement of said cam, said ram having a cutter edge on its lower end movable past said cutter bar, movably mounted feeding means adjacent said chute and in the path of movement of said cam and movable by said cam in one direction, and means urging said feeding means in the reverse direction, said cam on said cross head engaging said ram on operative movement of said cross head to cause said ram to sever a fastener from the strip and to apply the severed fastener, said cam on said operative movement of the cross head also engaging said feeding means to set the same for feeding the strip and, on return movement of said cross head, disengaging from said feeding means to permit said feeding means to operate automatically to feed the strip and advance another fastener into position to be operated upon by said ram in a subsequent fastener applying operation.

7. A tool for applying fasteners comprising a base including a chute for a strip of fasteners, a cutter bar on said base, a cross head mounted for reciprocation in said tool, a cam on said cross head, a reciprocable ram adjacent an end of said chute and in the path of movement of said cam, said ram having a cutter edge on its lower end movable past said cutter bar, feeding means adjacent said chute and comprising a movably mounted member in the path of movement of said cam and including a feeding dog carried by said member, said member and dog being movable by said cam in one direction, and means urging said member and dog in the reverse direction, said cam on said cross head engaging said ram on operative movement of said cross head to cause said ram to sever a fastener from the strip and to apply the severed fastener, said cam on said operative movement of the cross head also engaging said movably mounted member to set said dog for feeding the strip and, on return movement of said cross head, disengaging from said member to permit said dog to operate automatically to feed the strip and advance another fastener into position to be operated upon by said ram in a subsequent fastener applying operation.

8. A tool for applying fasteners comprising a base including a chute for a strip of fasteners, a cutter bar on said base, a cross head mounted for reciprocation in said tool, a cam on said cross head, a reciprocable ram adjacent an end of said chute and in the path of movement of said cam, said ram having a cutter edge on its lower end movable past said cutter bar, feeding means adjacent said chute and comprising a pivotally mounted lever in the path of movement of said cam and a feeding dog carried by said lever, said lever and dog being movable by said cam in one direction, and means urging said lever and dog in the reverse direction, said cam on said cross head engaging said ram on operative movement of said cross head to cause said ram to sever a fastener from the strip and to apply the severed fastener, said cam on said operative movement of the cross head also engaging said lever to set said dog for feeding the strip and, on return movement of said cross head, disengaging from said lever to permit said dog to operate automatically to feed the strip and advance another fastener into position to be operated upon by said ram in a subsequent fastener applying operation.

9. A tool for applying fasteners comprising a base including a chute for a strip of fasteners, a cutter bar on said base, a cross head mounted for reciprocation in said tool, a cam on said cross head, a reciprocable ram adjacent an end of said chute and in the path of movement of said cam, said ram having a cutter edge on its lower end movable past said cutter bar, and a presser foot included in said ram located adjacent the lower end of said ram, movably mounted feeding means adjacent said chute and in the path of movement of said cam and movable by said cam in one direction, and means urging said feeding means in the reverse direction, said cam on said cross head engaging said ram on operative movement of said cross head to cause said ram to sever a fastener from the strip and said presser foot to apply the severed fastener, said cam on said operative movement of the cross head also engaging said feeding means to set the same for feeding the strip and, on return movement of said cross head, disengaging from said feeding means to permit said feeding means to operate automatically to feed the strip and advance another fastener into position to be operated upon by said ram and presser foot in a subsequent fastener applying operation.

10. A foot for applying fasteners comprising a base including a chute for a strip of fasteners, a cutter bar on said base, a cross head mounted for reciprocation in said tool, fluid pressure means for reciprocating said cross head comprising a cylinder serving also as a handle for said tool, a cam on said cross head, a reciprocable ram adjacent an end of said chute and in the path of movement of said cam and having a cutter edge at its lower end movable past said cutter bar, and a presser foot included in said ram and located adjacent the lower end of said ram, feeding means adjacent said chute and comprising a pivotally mounted lever in the path of movement of said cam and a pair of feeding dogs carried by said lever, said lever and dogs being movable by said cam in one direction, and a spring urging said lever and dogs in the reverse direction, said cam on said cross head engaging said ram on operative movement of said cross head to cause said ram to sever a fastener from the strip and said presser foot to apply the severed fastener, said cam on said operative movement of the cross head also engaging said lever to set said dogs for feeding the strip and, on return movement of said cross head, disengaging from said lever to permit said dogs to operate automatically to feed the strip and advance another fastener into position to be operated upon by said ram and presser foot in a subsequent fastener applying operation.

GEORGE A. TINNERMAN.
JAMES F. RAFFERTY.

REFERENCES CITED

The following references are of record in the file of this patent:

UNITED STATES PATENTS

| Number | Name | Date |
| --- | --- | --- |
| 1,241,483 | Williams | Sept. 25, 1917 |
| 1,485,328 | Brooks | Feb. 26, 1924 |
| 1,512,653 | Tinnerman | Oct. 21, 1924 |
| 2,310,756 | Tinnerman | Feb. 9, 1943 |
| 2,315,209 | Kost | Mar. 30, 1943 |
| 2,470,891 | Hammers | May 24, 1949 |

FOREIGN PATENTS

| Number | Country | Date |
| --- | --- | --- |
| 597,178 | Germany | May 18, 1934 |